US012500461B2

(12) United States Patent
Hill et al.

(10) Patent No.: US 12,500,461 B2
(45) Date of Patent: Dec. 16, 2025

(54) ROTOR WITH MAGNET RETENTION BAND FOR USE WITH ELECTRIC MACHINES

(71) Applicants: Rolls-Royce Corporation, Indianapolis, IN (US); Rolls-Royce North American Technologies Inc., Indianapolis, IN (US)

(72) Inventors: Mathew Hill, Danville, IN (US); Peter Schenk, Indianapolis, IN (US); Jeffrey Coffee, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 280 days.

(21) Appl. No.: 18/195,665

(22) Filed: May 10, 2023

(65) Prior Publication Data

US 2024/0380258 A1    Nov. 14, 2024

(51) Int. Cl.
*H02K 1/2706* (2022.01)
*H02K 1/02* (2006.01)

(52) U.S. Cl.
CPC .............. *H02K 1/2706* (2013.01); *H02K 1/02* (2013.01)

(58) Field of Classification Search
CPC ........ H02K 5/124; H02K 5/163; H02K 5/165; H02K 5/167; H02K 5/173; H02K 1/27; H02K 1/2706
See application file for complete search history.

(56) References Cited

U.S. PATENT DOCUMENTS

| | | | |
|---|---|---|---|
| 5,111,094 A | 5/1992 | Patel et al. | |
| 5,122,704 A | 6/1992 | Blakeley et al. | |
| 5,992,007 A | 11/1999 | Morii et al. | |
| 7,857,593 B2 | 12/2010 | Garin et al. | |
| 10,439,456 B2 | 10/2019 | Bhageerath et al. | |
| 10,714,998 B2 | 7/2020 | Kelly et al. | |
| 10,826,360 B2 | 11/2020 | Tam et al. | |
| 10,971,961 B2 | 4/2021 | Kim et al. | |
| 11,038,394 B2 | 6/2021 | Chhabra et al. | |
| 11,081,918 B2 | 8/2021 | Andonian et al. | |
| 11,081,919 B2 | 8/2021 | Andonian et al. | |
| 11,404,922 B2 | 8/2022 | Iwamoto et al. | |
| 2010/0001597 A1* | 1/2010 | Noll | H02K 5/203 310/58 |
| 2014/0110227 A1* | 4/2014 | Ragan | H02K 11/33 310/43 |
| 2022/0209601 A1 | 6/2022 | Page et al. | |

(Continued)

FOREIGN PATENT DOCUMENTS

| EP | 3501088 B1 * | 8/2020 | ............... H02K 1/27 |
|---|---|---|---|
| KR | 20220084579 A * | 6/2022 | ............... H02K 1/14 |

OTHER PUBLICATIONS

EP3501088B1 Translation (Year: 2025).*
18195665_2025-04-10_KR_20220084579_A_H.pdf (Year: 2025).*

*Primary Examiner* — Christopher M Koehler
*Assistant Examiner* — Ahmed F Seck
(74) *Attorney, Agent, or Firm* — Barnes & Thornburg

(57) ABSTRACT

A rotor assembly for an electric machine includes a rotor segment configured to rotate about an axis and having a rotor body, a side wall and an outer band that cooperate to form a cavity, a plurality of magnets located in the cavity, and an end plate configured to block the plurality of magnets within the cavity.

20 Claims, 4 Drawing Sheets

(56) References Cited

U.S. PATENT DOCUMENTS

2022/0247244 A1 8/2022 Hoyland
2022/0271588 A1 8/2022 Hoyland
2022/0278584 A1 9/2022 Hoyland

* cited by examiner

ROTOR WITH MAGNET RETENTION BAND FOR USE WITH ELECTRIC MACHINES

FIELD OF THE DISCLOSURE

The present disclosure relates generally to electric machines adapted for use with gas turbine engines, and more specifically to rotor assemblies of such electric machines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines may be used in a hybrid electric propulsion system used to power the aircraft. The hybrid electric propulsion system has an electric machine powered directly or indirectly from the gas turbine engine. The electric machine is configured to power a propeller for providing thrust for the aircraft.

Electric machines typically include permanent magnets arranged around a rotor that rotates about an axis. Conventional electric machines use banding arranged around the permanent magnets to couple the permanent magnets with the rotor. Such banding may reduce electromagnetic fields or have low load capabilities resulting in lower rotation speeds and, therefore, lower power output. There remains a desire to retain permanent magnets on a rotor while allowing for higher speeds and load capabilities.

SUMMARY

The present disclosure may comprise one or more of the following features and combinations thereof.

A rotor assembly for an electric machine may include a rotor segment configured to rotate about an axis, a plurality of magnets, and an end plate. The rotor segment may have a rotor body arranged circumferentially about the axis, a side wall that extends radially away from the rotor body, and an outer band that extends axially away from the side wall to form a cavity radially between the rotor body and the outer band. The side wall may be integrally formed with the rotor body, and the outer band may have a first end integrally formed with the side wall and a terminal second end axially opposite the first end. The plurality of magnets may be located in the cavity and may be configured to apply a radially outward force to the outer band during rotation of the rotor assembly.

The end plate may be configured to block the plurality of magnets within the cavity. The end plate may have a shaft body arranged circumferentially around the axis and a cover plate that extends radially outward from the shaft body. A radial outer end of the cover plate may be coupled with the terminal second end of the outer band to radially retain the second end. The end plate may be coupled with the rotor segment to cause the cover plate of the end plate and the side wall of the rotor segment to cooperate and apply an axial compressive force to the plurality of magnets to transfer at least a portion of the torque axially from the rotor segment to the plurality of magnets.

In some embodiments, the rotor body, side wall, and outer band may be made of a non-magnetic material. In some embodiments, the non-magnetic material may be a non-conductive material.

In some embodiments, the rotor segment may further include an inner band arranged radially inward of the outer band relative to the axis to cooperate with the outer band to form the cavity. In some embodiments, the inner band may comprise ferrous material.

In some embodiments, the rotor segment may further include fasteners that extend axially through the end plate and into the outer band. In some embodiments, the cover plate may be formed to define an axially and circumferentially extending channel and the second end of the outer band may be received within the channel. In some embodiments, the cover plate may include a plate body and an engagement ring that extends axially away from the plate body. The engagement ring may have a predetermined axial width sized with the side wall to apply a desired axial force load on the plurality of magnets.

In some embodiments, the rotor segment may further include one or more projections coupled to and extending radially away from the outer band. The one or more projections may be configured to move air axially along the axis during rotation of the rotor assembly. In some embodiments, the one or more projections may form a helix.

According to another aspect of the present disclosure, an electric machine adapted for use in an aircraft propulsion system may include a stator including a plurality of windings extending along an axis, a rotor segment axially aligned with the stator, and an end plate. The stator may be configured to rotate about the axis. The rotor segment may be configured to rotate adjacent to the stator. The rotor segment may include a rotor body arranged circumferentially about the axis, a side wall that extends radially away from the rotor body, and an outer band that extends axially away from the side wall to form a cavity radially between the rotor body and the outer band. The cavity may be adapted to receive a plurality of magnets therein. The outer band may have a first end integrally formed with the side wall and a terminal second end axially opposite the first end.

The end plate may have a shaft body arranged circumferentially around the axis and a cover plate that extends radially outward from the shaft body. The shaft body may be coupled to a shaft of the electric machine. The cover plate may be coupled to the outer band to cause the cover plate and the outer band to cooperate and block radial deflection of the terminal second end of the outer band to contain the plurality of magnets within the cavity during rotation of the shaft, the rotor segment, and the end plate.

In some embodiments, the rotor body may comprise a shaft band coupled to and arranged circumferentially about the shaft, a support band spaced radially outward of the shaft band and coupled to the side wall, and an intermediate band interconnecting the shaft band and the support band. In some embodiments, the inner band may be positioned radially between the outer band and the support band. In some embodiments, the intermediate band may extend axially away from the shaft band towards the end plate. In some embodiments, the shaft band, the intermediate band and the support band may cooperate to define a U-shaped passageway positioned radially between the shaft band and the support band. The U-shaped passageway may include an opening that is axially aligned with the side wall.

In some embodiments, the rotor segment may further include an inner band arranged radially inward of the outer band relative to the axis to cooperate with the outer band to form the cavity. In some embodiments, the inner band may comprise ferrous material.

According to another aspect of the present disclosure, a method may include providing a rotor assembly having a rotor segment and an end plate, the rotor segment including a rotor body arranged circumferentially about an axis, a sidewall that extends radially away from the rotor body, and an outer band that extends axially away from the sidewall towards the end plate, rotating the rotor assembly about the axis such that the end plate and the side wall cooperate and apply an axial compressive force to a plurality of magnets located inside a cavity formed radially between the outer band and the rotor body to transfer at least a portion of the torque axially from the rotor segment to the plurality of magnets.

In some embodiments, the rotor body, side wall, and outer band may be made of a non-magnetic material. In some embodiments, the non-magnetic material may be a non-conductive material.

These and other features of the present disclosure will become more apparent from the following description of the illustrative embodiments.

DETAILED DESCRIPTION OF THE DRAWINGS

Figure 1:
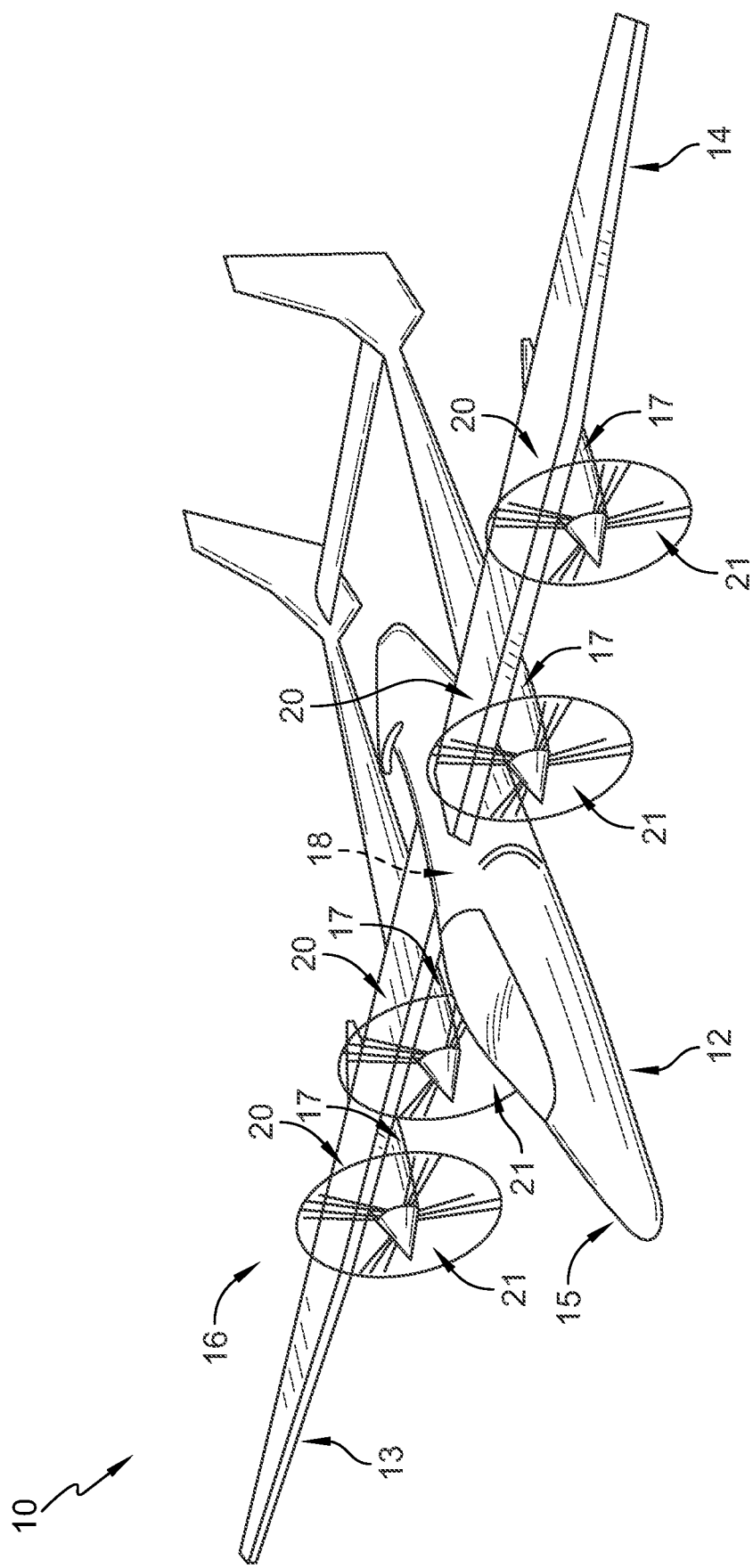
FIG. 1 is a perspective view of an aircraft showing the aircraft including an airframe with wings and a hybrid electric propulsion system having a gas turbine engine and an electric machine in accordance with the present disclosure coupled with one of the propellers and configured to power the propeller for providing thrust for the aircraft.

For the purposes of promoting an understanding of the principles of the disclosure, reference will now be made to a number of illustrative embodiments illustrated in the drawings and specific language will be used to describe the same.

An aircraft 10 having electric machines 20 in accordance with the present disclosure is shown, for example, in FIG. 1. The aircraft 10 includes an airframe 12 with wings 13, 14 extending from a fuselage 15 and an electric propulsion system 16. The electric propulsion system 16 includes a gas turbine engine 18, electric machines 20, and propellers 21 or other propulsor as shown in FIG. 1. In some embodiments, the electric propulsion system 16 further includes one or more generators, motors, and/or batteries. In the illustrative embodiment, the electric machine 20 is a motor. In some embodiments, the electric machine 20 is a motor-generator. The illustrative example discloses the electric machine 20 as a motor to power the propeller 21. In other embodiments, the electric machine 20 may not be coupled with a propeller and instead used to power other equipment such as a compressor, pump, etc. and/or is used to generate electric power.

Figure 2:
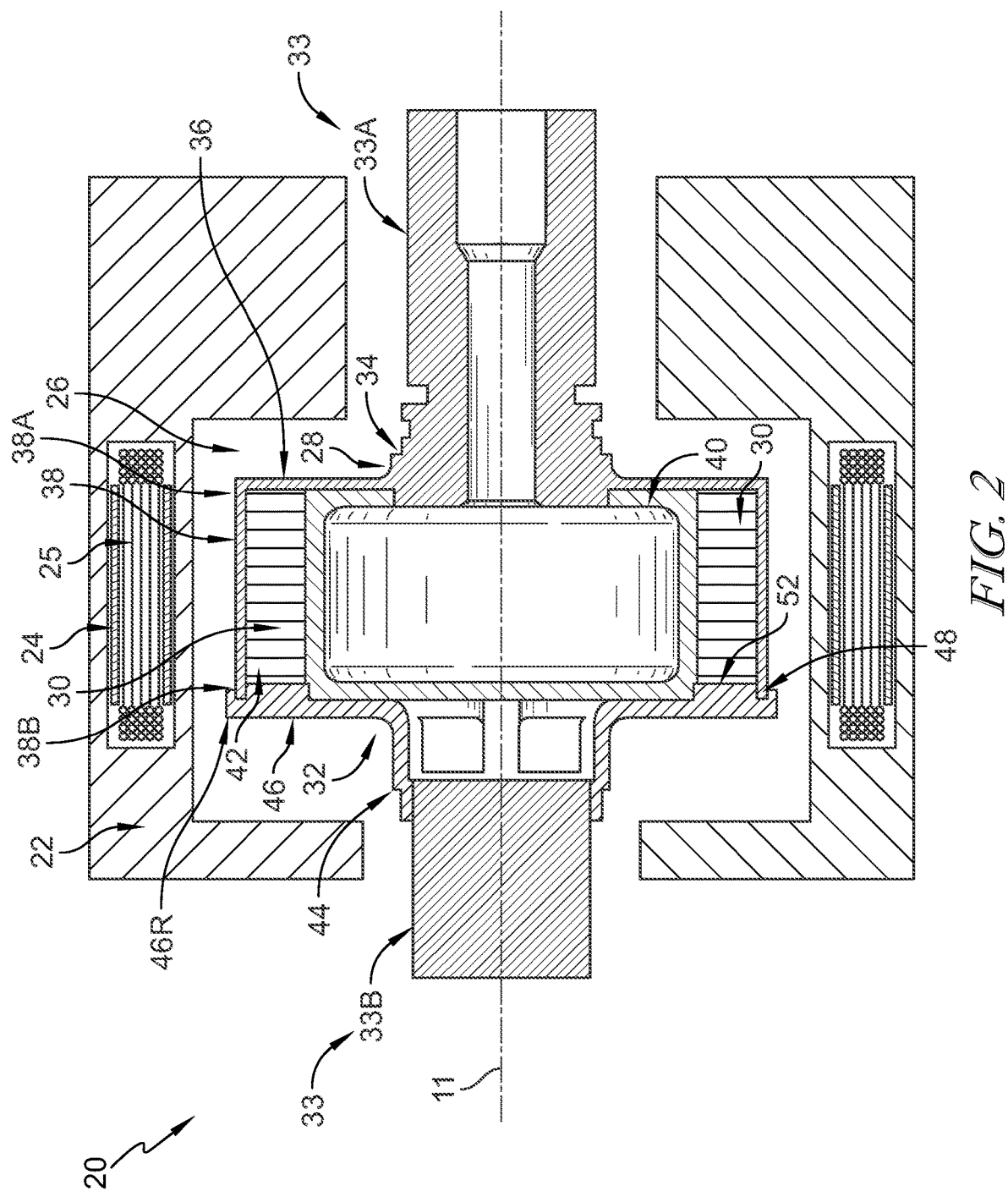
FIG. 2 is a cross-sectional view of the electric machine of FIG. 1 showing that the electric machine includes a rotor assembly and a stator arranged around the rotor assembly, the rotor assembly including a rotor segment that is rotatable about an axis and formed to include a cavity, a plurality of magnets located in the cavity, and an end plate that blocks the plurality of magnets within the cavity.

Each electric machine 20 includes a case 22, a stator 24 coupled with the case 22, and a rotor assembly 26 as shown in FIG. 2. The rotor assembly 26 is configured to receive electric energy and rotate about an axis 11 relative to the case 22 and the stator 24. In some embodiments, the electric machine 20 may rotate the rotor assembly 26, for example from wind milling, to generate electric energy. When rotated about the axis 11, the rotor assembly 26 applies forces to a plurality of magnets 30 included in the rotor assembly 26 to transfer at least a portion of the torque axially from portions of the rotor assembly 26 to the plurality of magnets 30. The rotor assembly 26 of the electric machine 20 may include features which minimize the weight of the system 16 while containing the plurality of magnets 30 inside a cavity 42 formed by components of the rotor assembly 26 during rotation of the rotor assembly 26 about the axis 11.

The electric machine 20 generates heat during use, which may cause the temperature of the rotor assembly 26 to increase without any active cooling. This may reduce the operating life of the electric machine 20. Other rotor cooling systems may use external fans to actively cool the electric machine 20. However, the external fan structure adds weight to the system 16. Turning again to the electric machine 20, the electric machine 20 is powered directly or indirectly from the gas turbine engine 18 and generator and/or one or more batteries. The gas turbine engine 18 combusts compressed air and fuel to produce rotational mechanical power. The rotational mechanical power produced by the gas turbine engine 18 may be used to power a generator to produce electric energy that is transferred to the electric machine 20 to drive rotation of the electric machine 20, as contemplated for the illustrative embodiment. The electrical energy from the generator may be transmitted to the electric machine 20 to drive rotation of the electric machine 20 and/or may be transmitted to the one or more batteries for storage and use by the electric machine 20 at a later time.

The electric machine 20 includes the case 22, the stator 24, and the rotor assembly 26 as shown in FIG. 2. The case 22 is included in or coupled with a nacelle 17 that is fixed with one of the wings 13, 14. In other embodiments, the electric machine 20 and, thus the case 22, may be located on or within the fuselage such or coupled to a wing 13, 14 via a container or pod. The stator 24 is configured to rotate about the axis 11 and includes a plurality of windings 25 that are arranged around the axis 11. For example, the windings 25 include copper windings configured to be electrically energized to provide an electromagnetic field. The plurality of windings 25 extend along the axis 11. The rotor assembly 26 is coupled with the propeller 21. The rotor assembly 26 includes features which contain the plurality of magnets 30 of the rotor assembly 30 within the cavity 42 formed by components of the rotor assembly 26 during rotation of the rotor assembly 26 about the axis 11.

Figure 3:
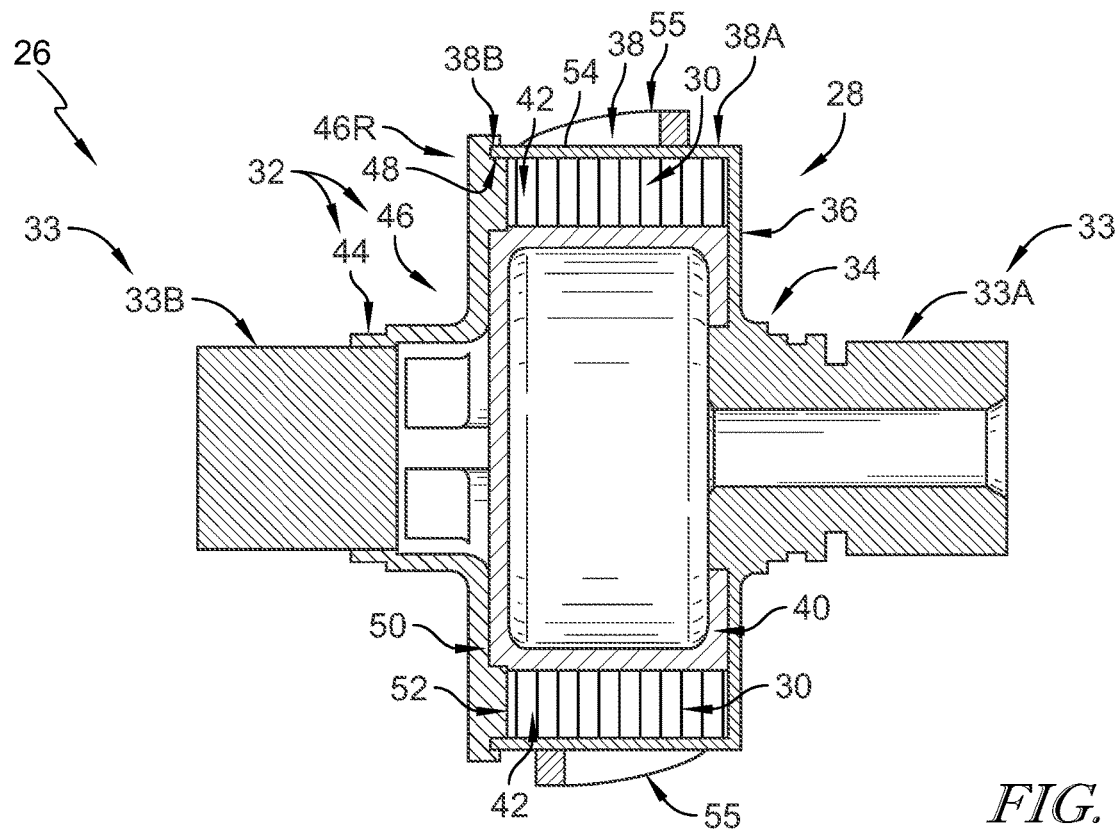
FIG. 3 is a detailed cross-sectional view of the rotor assembly of FIG. 2 showing that the end plate includes a shaft body and a cover plate that extends axially outward away from the shaft body, the cover plate being formed to define an axially and circumferentially extending channel and a portion of the rotor segment being received within the channel.

The rotor assembly 26 includes a rotor segment 28, the plurality of magnets 30, an end plate 32, and a shaft 33 as shown in FIG. 3. The rotor segment 28 is configured to rotate about the axis 11 and is coupled to the shaft 33. Additionally, the rotor segment 28 is axially aligned with the stator 24, as shown in FIG. 2, and is configured to rotate adjacent to the stator 24. The plurality of magnets 30 apply a radially outward force to a portion of the rotor segment 28 during rotation of the rotor assembly 26. The end plate 32 is configured to interlock with an outer band 38 of the rotor segment 28 to block the plurality of magnets 30 from moving axially radially away from the rotor segment 28 during rotation of the rotor assembly 26. The shaft 33 includes a body shaft 33A coupled with the rotor segment 28 and a plate shaft 33B coupled with the end plate 32. In some embodiments, the body shaft 33A may be integrally formed with the rotor segment 28 and/or the plate shaft 33B may be integrally formed with the end plate 32.

The rotor segment 28 includes a rotor body 34, a side wall 36, an outer band 38, and an inner band 40 as shown in FIG. 3. The rotor body 34 is arranged circumferentially about the axis 11. The side wall 36 is integrally formed with the rotor body 34 in the illustrative embodiment and extends radially away from the rotor body 34 relative to the axis 11. The outer band 38 is positioned radially outward from the rotor body 34.

In the illustrative embodiment, the outer band 38 includes a first end 38A integrally formed with the side wall 36 and a terminal second end 38B axially opposite the first end 38A. The inner band 40 is positioned radially between the rotor body 34 and the outer band 38. The inner band 40 may be integrally formed with the rotor body 34 or may be a separate component. The outer band 38 and the inner band 40 each extend axially away from the side wall 36 to form the cavity 42 radially between the outer band 38 and the inner band 40. In other words, the outer band 38 and the inner band 40 cooperate for form the cavity 42 therebetween that is adapted to receive the plurality of magnets 30 therein. In some embodiments, the rotor body 34, the side wall 36 and the outer band 38 are made of a non-magnetic material such as, for example, polymeric materials and engineered plastics. In such embodiments, the non-magnetic material may be a non-conductive material. Alternatively or additionally, the inner band 40 may be made of ferrous material.

The plurality of magnets 30 are located in the cavity 42 as shown in FIG. 3. The plurality of magnets 30 are configured to apply rotational forces in response to the electromagnetic field generated by the stator 24. In the illustrative embodiment, the plurality of magnets 30 are sequentially arranged axially relative to the axis 11. Additionally or alternatively, the plurality of magnets 30 may be sequentially arranged circumferentially and/or radially relative to the axis 11. In some embodiments, the plurality of magnets 30 may be one magnet extending circumferentially, radially, and/or axially within the cavity 42.

The end plate 32 is configured to block the plurality of magnets 30 within the cavity 42 and seal the cavity 42 as shown in FIG. 3. The end plate 32 includes a shaft body 44 arranged circumferentially around the axis 11 and a cover plate 46 that extends radially outward from the shaft body 44. The shaft body 44 is coupled to the shaft 33B. In the illustrative embodiment, the shaft body 44 defines an inner diameter that is greater than or equal to a diameter of the shaft 33B such that at least a portion of the shaft body 44 is arranged radially outward and circumferentially around the shaft 33B. In other embodiments, the shaft 33B may be integrally coupled with the shaft body 44.

The cover plate 46 is coupled to the outer band 38 to cause the cover plate 46 and the outer band 38 to cooperate to block radial deflection of the terminal second end 38B of the outer band 38 to contain the plurality of magnets 30 within the cavity 42 during rotation of the shaft 33, the rotor segment 28, and the end plate 32. The cover plate 46 and the side wall 36 also cooperate and apply an axial compressive force to the plurality of magnets 30 to transfer at least a portion of the torque axially from the rotor segment 28 to the plurality of magnets 30.

A radial outer end 46R of the cover plate 46 is coupled with the terminal second end 38B of the outer band 38 to radially retain the terminal second end 38B as shown in FIG. 3. The cover plate 46 is formed to define an axially and circumferentially extending channel 48 which is configured to receive the terminal second end 38B of the outer band 38. Accordingly, the channel 48 may have a radial width relative to the axis 11 that is greater than or equal to a radial width of the terminal second end 38B.

The cover plate 46 also includes a plate body 50 and an engagement ring 52 that extends axially away from the plate body 50 towards the side wall 36. In the illustrative embodiment, the engagement ring 52 is positioned radially between the outer band 38 and the inner band 40 when the radial outer end 46R of the cover plate 46 is coupled with the terminal second end 38B of the outer band 38. The engagement ring 52 is sized axially to apply a desired axial force load on the plurality of magnets 30 during rotation of the rotor assembly 26 about the axis 11.

In some embodiments, the rotor segment 28 may further include fasteners (not shown) that extend axially and radially through the end plate 32 and into the outer band 38 of the rotor segment 28. For example, the fasteners may extend axially and radially through the cover plate 46 and into the terminal second end 38B of the outer band 38. In some embodiments, the fasteners may be one or more pocket screws.

In some embodiments, the rotor segment 28 may further include one or more projections 55 coupled to and extending radially away from an outer surface 54 of the outer band 38. The one or more projections may be configured to move air axially along the axis 11 outside the rotor segment 26. In some embodiments, the one or more projections may form a helix.

Figure 4:
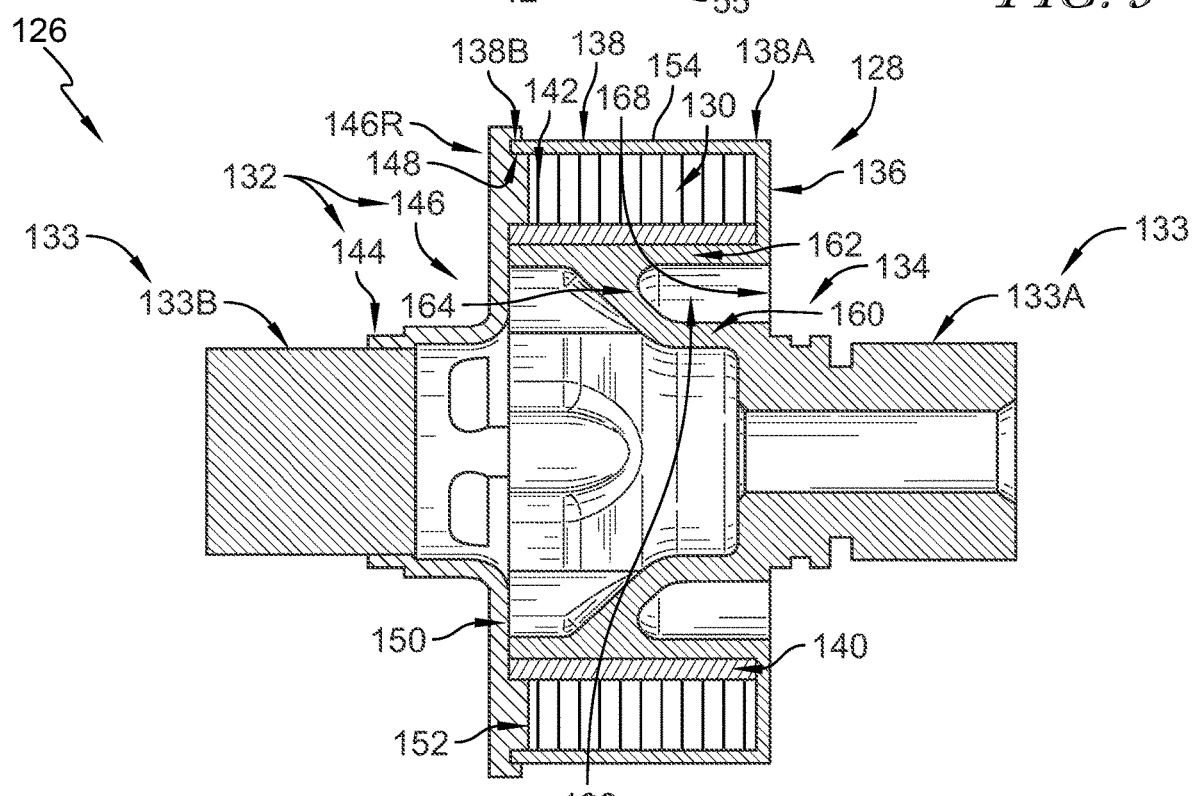
FIG. 4 is a detailed cross-sectional view of another embodiment of the rotor assembly of FIG. 2 showing that the rotor segment includes a rotor body having a shaft band coupled to and arranged circumferentially about the shaft, a support band spaced radially outward of the shaft band, and an intermediate band interconnecting the shaft band and the support band to define a U-shaped passageway having an opening axially aligned a the side wall of the rotor body.

Another embodiment of a rotor assembly 126 is shown in FIG. 4. The rotor assembly 126 is similar to the rotor assembly 26 shown in FIGS. 2 and 3 and described herein. Accordingly, similar reference numbers in the 100 series indicate features that are common between the rotor assembly 126 and the rotor assembly 26. The description of the rotor assembly 26 is incorporated by reference to apply to the rotor assembly 126, except in instances when they conflict with the specific description and the drawings of the rotor assembly 126. Specifically, the rotor assembly 126 includes a rotor body 134 having a shaft band 160, a support band 162, and an intermediate band 164 interconnecting the shaft band 160 and the support band 162. The shaft band 160, the support band 162, and the intermediate band 164 cooperate to define a U-shaped passageway 166 positioned radially between the shaft band 160 and the support band 162.

The rotor assembly 126 includes a rotor segment 128, a plurality of magnets 130, an end plate 132, and a shaft 133 as shown in FIG. 4. The rotor segment 128 is configured to rotate about the axis 11 and is coupled to the shaft 133. Additionally, the rotor segment 128 may be axially aligned with the stator 24, and may be configured to rotate adjacent to the stator 24. The plurality of magnets 130 apply a radially outward force to a portion of the rotor segment 128 during rotation of the rotor assembly 126. The end plate 132 is configured to interlock with an outer band 138 of the rotor segment 128 to block the plurality of magnets 130 from moving axially forward away from the rotor segment 128 and radially outward during rotation of the rotor assembly 126. The shaft 133 includes a body shaft 133A coupled with the rotor segment 128 and a plate shaft 133B coupled with the end plate 132. In some embodiments, the body shaft 133A may be integrally formed with the rotor segment 128 and/or the plate shaft 133B may be integrally formed with the end plate 132.

The rotor segment 128 includes the rotor body 134, a side wall 136, an outer band 138, and an inner band 140 as shown in FIG. 4. The rotor body 134 is arranged circumferentially about the axis 11. The side wall 136 is integrally formed with the rotor body 134 in the illustrative embodiment and extends radially away from the rotor body 134 relative to the axis 11. The outer band 138 is positioned radially outward from the rotor body 134. The outer band 138 includes a first end 138A integrally formed with the side wall 136 and a terminal second end 138B axially opposite the first end 138A. The inner band 140 is positioned radially between the rotor body 134 and the outer band 138. The inner band 140 may be integrally formed with the rotor body 134 or may be a separate component. The outer band 138 and the inner band 140 each extend axially away from the side wall 136 to form the cavity 142 radially between the outer band 138 and the inner band 140. In other words, the outer band 138 and the inner band 140 cooperate for form the cavity 142 therebetween that is adapted to receive the plurality of magnets 130 therein. In some embodiments, the rotor body 134, the side wall, 136 and the outer band 138 are made of a non-magnetic material such as, for example, polymeric materials and engineered plastics. In such embodiments, the non-magnetic material may be a non-conductive material. The inner band 140 is made of ferrous material in the illustrative embodiment.

As shown in FIG. 4, the rotor body 134 includes the shaft band 160, the support band 162, and the intermediate band 164 interconnecting the shaft band 160 and the support band 162. The shaft band 160 is coupled to and arranged circumferentially around at least a portion of the body shaft 133A. The support band 162 is spaced radially outward of the shaft band 160 and is coupled to the side wall 136. The intermediate band 164 extends axially and radially away from the shaft band 160 towards the end plate 132 and the support band 162. The inner band 140 is positioned radially between the outer band 138 and the support band 162.

The shaft band 160, the intermediate band 164 and the support band 162 cooperate to define the U-shaped passageway 166 positioned radially between the shaft band 160 and the support band 162. The U-shaped passageway 166 includes an opening 168 that is axially aligned with the side wall 136.

The plurality of magnets 130 are located in the cavity 142 as shown in FIG. 4. The plurality of magnets 130 are configured to apply rotational forces in response to the electromagnetic field generated by the stator 24. In the illustrative embodiment, the plurality of magnets 130 are sequentially arranged axially relative to the axis 11. Additionally or alternatively, the plurality of magnets 130 may be sequentially arranged circumferentially and/or radially relative to the axis 11. In some embodiments, the plurality of magnets 130 may be one magnet extending circumferentially, radially, and/or axially within the cavity 142.

The end plate 132 is configured to block the plurality of magnets 130 within the cavity 142 and seal the cavity 142 as shown in FIG. 4. The end plate 132 includes a shaft body 144 arranged circumferentially around the axis 11 and a cover plate 146 that extends radially outward from the shaft body 144. The shaft body 144 is coupled to the shaft 133B. In the illustrative embodiment, the shaft body 144 defines an inner diameter that is greater than or equal to a diameter of the shaft 133B such that at least a portion of the shaft body 144 is arranged radially outward and circumferentially around the shaft 133B. In other embodiments, the shaft 133B may be integrally coupled with the shaft body 144.

The cover plate 146 is coupled to the outer band 138 to cause the cover plate 146 and the outer band 138 to cooperate to block radial deflection of the terminal second end 138B of the outer band 138 to contain the plurality of magnets 130 within the cavity 142 during rotation of the shaft 133, the rotor segment 128, and the end plate 132. The cover plate 146 and the side wall 136 also cooperate and apply an axial compressive force to the plurality of magnets 130 to transfer at least a portion of the torque axially from the rotor segment 128 to the plurality of magnets 130.

A radial outer end 146R of the cover plate 146 is coupled with the terminal second end 138B of the outer band 138 to radially retain the terminal second end 138B as shown in FIG. 4. The cover plate 146 is formed to define an axially and circumferentially extending channel 148 which is configured to receive the terminal second end 138B of the outer band 138. Accordingly, the channel 148 may have a radial width relative to the axis 11 that is greater than or equal to a radial width of the terminal second end 138B. The cover plate 146 also includes a plate body 150 and an engagement ring 152 that extends axially away from the plate body 150 towards the side wall 136. In the illustrative embodiment, the engagement ring 152 is positioned radially between the outer band 138 and the inner band 140 when the radial outer end 146R of the cover plate 146 is coupled with the terminal second end 138B of the outer band 138. The engagement ring 152 is sized axially to apply a desired axial force load on the plurality of magnets 130 during rotation of the rotor assembly 126 about the axis 11.

In some embodiments, the rotor segment 128 may further include fasteners (not shown) that extend axially and radially through the end plate 132 and into the outer band 138 of the rotor segment 128. For example, the fasteners may extend axially and radially through the cover plate 146 and into the terminal second end 138B of the outer band 138. In some embodiments, the fasteners may be one or more pocket screws.

In some embodiments, the rotor segment 128 may further include one or more projections coupled to and extending radially away from an outer surface 154 of the outer band 138, as described with reference to FIG. 3 above. The one or more projections may be configured to move air axially along the axis 11 outside the rotor segment 126. In some embodiments, the one or more projections may form a helix.

Figure 5:
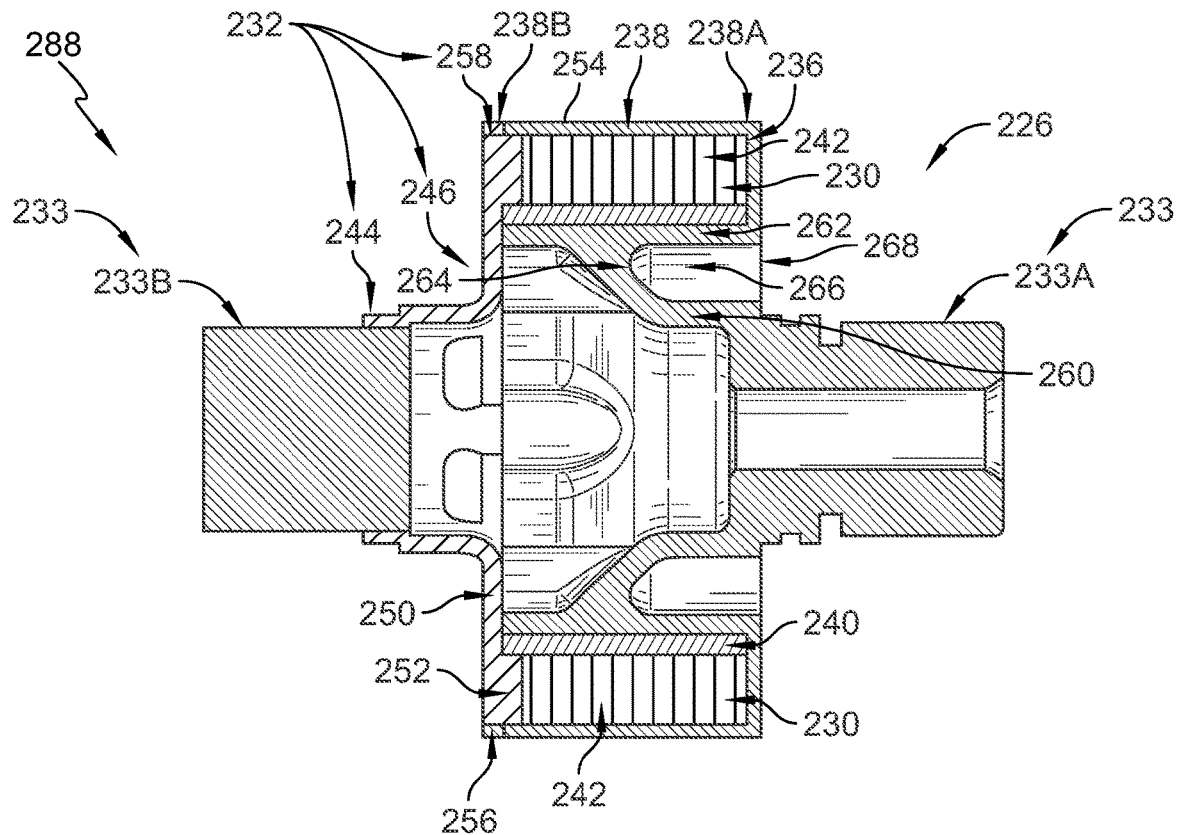
FIG. 5 is a detailed cross-sectional of another embodiment of the rotor assembly of FIG. 2 showing that the rotor segment includes a first plurality of dovetails extending radially inward away from an outer band of the rotor segment and the end plate is formed to define a second plurality of dovetails extending radially outward away from the cover plate.
Figure 6:
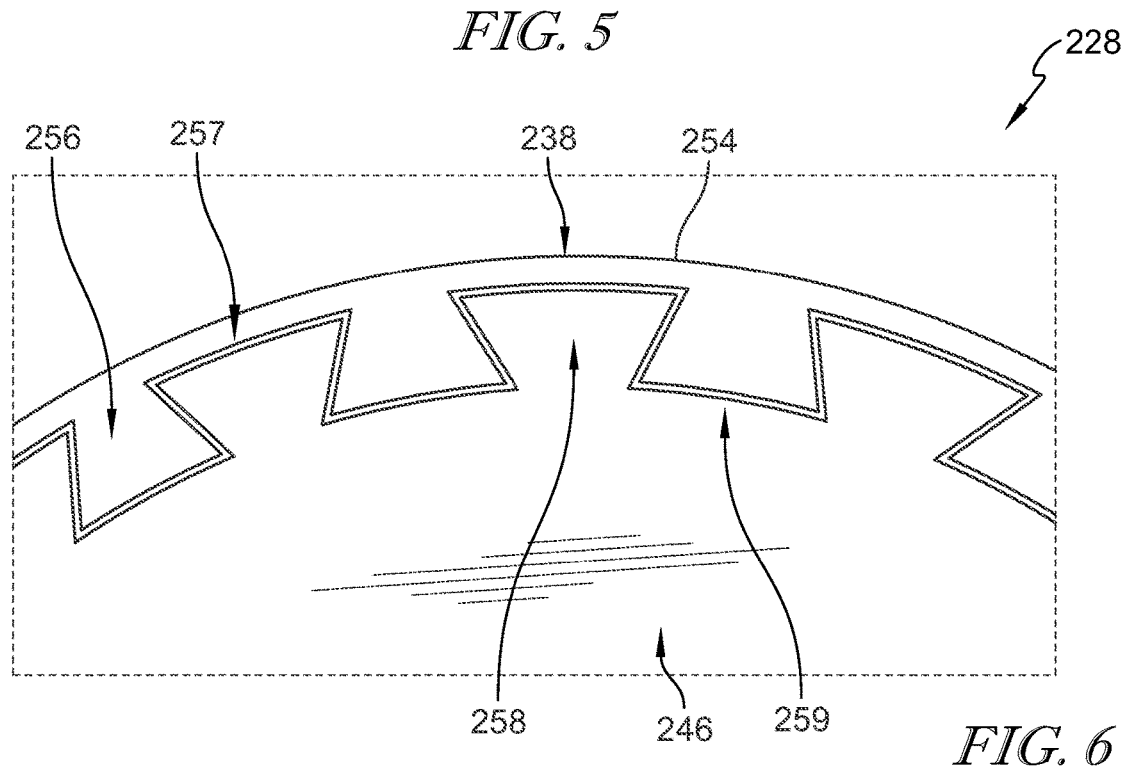
FIG. 6 is a detailed perspective view of the rotor assembly of FIG. 5 showing that the first plurality of dovetails are spaced apart circumferentially about the axis and cooperate to define a first plurality of dovetail-receivers, and that the second plurality of dovetails are spaced apart circumferentially about the axis and cooperating to define a second plurality of dovetail-receivers.

Another embodiment of a rotor assembly 226 is shown in FIGS. 5 and 6. The rotor assembly 226 is similar to the rotor assemblies 26, 126 shown in FIGS. 2-4 and described herein. Accordingly, similar reference numbers in the 200 series indicate features that are common between the rotor assembly 226 and the rotor assemblies 26, 126. The descriptions of the rotor assemblies 26, 126 are incorporated by reference to apply to the rotor assembly 226, except in instances when they conflict with the specific description and the drawings of the rotor assembly 226. Specifically, the rotor segment 228 further includes a plurality of dovetails 256 which cooperate to define a plurality of dovetail-receivers 257. The end plate 232 also includes a plurality of dovetails 258 which cooperate to define a plurality of dovetail-receivers 259 so that the end plate 232 is coupled to the outer band 238 via the pluralities of dovetails 256, 258.

The rotor assembly 226 includes a rotor segment 228, a plurality of magnets 230, an end plate 232, and a shaft 233 as shown in FIG. 5. The rotor segment 228 is configured to rotate about the axis 11 and is coupled to the shaft 233. Additionally, the rotor segment 228 may be axially aligned with the stator 24, and may be configured to rotate adjacent to the stator 24. The plurality of magnets 230 apply a radially outward force to a portion of the rotor segment 228 during rotation of the rotor assembly 226. The end plate 232 is configured to interlock with an outer band 238 of the rotor segment 228 to block the plurality of magnets 230 from moving axially radially away from the rotor segment 228 during rotation of the rotor assembly 226. The shaft 233 includes a body shaft 233A coupled with the rotor segment 228 and a plate shaft 233B coupled with the end plate 232. In some embodiments, the body shaft 233A may be integrally formed with the rotor segment 228 and/or the plate shaft 233B may be integrally formed with the end plate 232.

The rotor segment 228 includes a rotor body 234, a side wall 236, an outer band 238, an inner band 240, and a first plurality of dovetails 256 as shown in FIGS. 5 and 6. The rotor body 234 is arranged circumferentially about the axis 11. The side wall 236 is integrally formed with the rotor body 234 in the illustrative embodiment and extends radially away from the rotor body 234 relative to the axis 11. The outer band 238 is positioned radially outward from the rotor body 234. The outer band 238 includes a first end 238A integrally formed with the side wall 236 and a terminal second end 238B axially opposite the first end 238A. The inner band 240 is positioned radially between the rotor body 234 and the outer band 238. The inner band 240 may be integrally formed with the rotor body 234 or may be a separate component. The outer band 238 and the inner band 240 each extend axially away from the side wall 236 to form the cavity 242 radially between the outer band 238 and the inner band 240. In other words, the outer band 238 and the inner band 240 cooperate for form the cavity 242 therebetween that is adapted to receive the plurality of magnets 230 therein. In some embodiments, the rotor body 234, the side wall, 236 and the outer band 238 are made of a non-magnetic material such as, for example, polymeric materials and engineered plastics. In such embodiments, the non-magnetic material may be a non-conductive material. The inner band 240 is made of ferrous material in the illustrative embodiment.

The first plurality of dovetails 256 extend radially inward away from the terminal second end 238B of the outer band 238 towards the axis 11 as shown in FIGS. 5 and 6. The first plurality of dovetails 256 are spaced apart circumferentially about the axis 11. Accordingly, the first plurality of dovetails 256 cooperate to define a first plurality of dovetail-receivers 257 to couple the rotor body 234 with the end plate 232 as described in further detail below.

As shown in FIG. 5, the rotor body 234 includes a shaft band 260, a support band 262, and an intermediate band 264 interconnecting the shaft band 260 and the support band 262. The shaft band 260 is coupled to and arranged circumferentially around at least a portion of the body shaft 233A. The support band 262 is spaced radially outward of the shaft band 260 and is coupled to the side wall 236. The intermediate band 264 extends axially and radially away from the shaft band 260 towards the end plate 232 and the support band 262. The inner band 240 is positioned radially between the outer band 238 and the support band 262.

The shaft band 260, the intermediate band 264 and the support band 262 cooperate to define a U-shaped passageway 266 positioned radially between the shaft band 260 and the support band 262. The U-shaped passageway 266 includes an opening 268 that is axially aligned with the side wall 236.

The plurality of magnets 230 are located in the cavity 242 as shown in FIG. 5. The plurality of magnets 230 are configured to apply rotational forces in response to the electromagnetic field generated by the stator 24. In the illustrative embodiment, the plurality of magnets 230 may be sequentially arranged circumferentially and/or radially relative to the axis 11. In some embodiments, the plurality of magnets 230 may be one magnet extending circumferentially, radially, and/or axially within the cavity 242.

The end plate 232 is configured to block the plurality of magnets 230 within the cavity 242 and seal the cavity 242 as shown in FIG. 5. The end plate 232 includes a shaft body 244 arranged circumferentially around the axis 11, a cover plate 246 that extends radially outward from the shaft body 244, and a second plurality of dovetails 258 extending radially outward away from the cover plate 246. The shaft body 244 is coupled to the shaft 233B. In the illustrative embodiment, the shaft body 244 defines an inner diameter that is greater than or equal to a diameter of the shaft 233B such that at least a portion of the shaft body 244 is arranged radially outward and circumferentially around the shaft 233B. In other embodiments, the shaft 233B may be integrally coupled with the shaft body 244. When the rotor assembly 228 is assembled, the second plurality of dovetails 258 are positioned radially between the cover plate 246 and the outer band 238.

The end plate 232 is coupled to the outer band 238 via the first plurality of dovetails 256 and the second plurality of dovetails 258 to cause the end plate 232 and the outer band 238 to cooperate to block radial deflection of the terminal second end 238B of the outer band 238 to contain the plurality of magnets 230 within the cavity 242 during rotation of the shaft 233, the rotor segment 228, and the end plate 232. The cover plate 246, the second plurality of dovetails 256 and the side wall 236 also cooperate and apply an axial compressive force to the plurality of magnets 230 to transfer at least a portion of the torque axially from the rotor segment 228 to the plurality of magnets 230.

The second plurality of dovetails 258 are spaced apart circumferentially about the axis 11 as shown in FIGS. 5 and 6. Accordingly, the second plurality of dovetails 258 cooperate to define a second plurality of dovetail-receivers 259. Thus, when assembled, the first plurality of dovetails 256 are received in the second plurality of dovetail-receivers 259 and the second plurality of dovetails 258 are received in the first plurality of dovetail-receivers 259. In the illustrative embodiment, a forward edge 270 of the terminal second end 238B is axially aligned with a forward surface 272 of the cover plate 246. In other embodiments, the first plurality of dovetails 256 and the second plurality of dovetails 258 are axially and radially aligned relative to the axis 11. In the illustrative embodiment, the end plate 232 is located radially inward of the outer band 238. Alternatively or additionally, no components of the end plate 232 are positioned radially outward of the outer band 238.

The cover plate 246 also includes a plate body 250 and an engagement ring 252 that extends axially away from the plate body 250 towards the side wall 236. In the illustrative embodiment, the engagement ring 252 is positioned radially between the outer band 238 and the inner band 240 when the cover plate 246 is coupled with the terminal second end 238B of the outer band 238. The engagement ring 252 is sized axially to apply a desired axial force load on the plurality of magnets 230 during rotation of the rotor assembly 226 about the axis 11.

In some embodiments, the rotor segment 228 may further include fasteners (not shown) that extend axially and radially through the end plate 232 and into the outer band 238 of the rotor segment 228. For example, the fasteners may extend axially and radially through the cover plate 246 and into the terminal second end 238B of the outer band 238. In some embodiments, the fasteners may be one or more pocket screws.

In some embodiments, the rotor segment 228 may further include one or more projections coupled to and extending radially away from an outer surface 254 of the outer band 238, as described with reference to FIG. 3 above. The one or more projections may be configured to move air axially along the axis 11 outside the rotor segment 226. In some embodiments, the one or more projections may form a helix.

A method may comprise providing a rotor assembly 26, 126, 226 and rotating the rotor assembly 26, 126, 226 about the axis 11 such that the end plate 32, 132, 232 and the side wall 36, 136, 236 cooperate and apply an axial compressive force to the plurality of magnets 30, 130, 230 located inside the cavity 42, 142, 242 to transfer at least a portion of the torque axially from the rotor segment 28, 128, 228 to the plurality of magnets 30, 130, 230. The method may further comprise rotating the rotor assembly 26, 126, 226 about the axis 11 such that the cover plate 46, 146, 246 and the outer band 38, 138, 238 cooperate and block radial deflection of the terminal second end 38B, 138B, 238B to contain the plurality of magnets 30, 130, 230 within the cavity 42, 142, 242 during rotation of the rotor assembly 26, 126, 226.

Conventional surface mounted permanent magnet electric machines 20 may utilize metallic banding to retain and maintain torque transfer. Other materials may be used for conventional rotor banding, which can limit operational speeds for a specific motor topology. Increasing speed capability in such designs is normally achieved by reducing active diameters, which decreases machine power density, or implement a composite banding solution, which requires exclusive testing programs.

Furthermore, electric machines 20 generate heat via losses (inefficiencies) during operation. Methods to actively cool the machine 20 generally increase weight and complexity. Some examples are: cooling jackets, flooded stators, spray cooling, air cooling, etc. Fittings, oil management, or increased housing mass reduce the overall power density of the machine to evacuate the excess heat. Additionally, including a liquid cooling system can have system level effects and air cooling may not be feasible due to environmental conditions. Adding fans for forced air cooling can be a complex and expensive addition.

The present disclosure relates to a rotor assembly 26, 126, 226 configuration that includes an integral outer band 38, 138, 238 arranged around the magnets 30, 130, 230. In this configuration, the retention sleeve or rotor segment 28, 128, 228 sees a significant increase to stiffness over the conventional design. This allows for a more stable interface that requires less nominal interference to maintain torque transferring capability. Reducing the nominal interference further reduces the overall stress in the area that is compared to the conventional rotor banding/sleeve/segment 38, 138, 238.

In the disclosed embodiments, the rotor banding/sleeve/segment 38, 138, 238 is integrated with the main shaft segment 33, 133, 233 and is trapped on the opposing end by an end plate 32, 132, 232 that has a lip or channel 48, 148 for the banding to slide into. This interface can also be managed by using a dove-tail configuration, shown in FIGS. 5 and 6, or a series of pocket screws, therefore no-longer requiring protrusion into an air gap, as described in other embodiments.

For example, the embodiment of FIG. 5 shows a dovetail attachment 258, 259 with a rotor end cap/plate 232 that is axially captured via a tie bolt (not shown) and a rotor banding/sleeve 238 that has dovetail features 256, 257 on one end. The rotor end cap/plate 232 slides on and is then fixed axially via a tie bolt (not shown). During rotation of the machine, the rotor banding/sleeve will want to move radially outward and is prevented from doing so by the dovetail features 258, 259 of the rotor end cap/plate 232. This is a similar construction to a gas turbine engine compressor with the rotor banding/sleeve 228 as the 'blades' and the end cap/plate 232 as the 'wheel'.

In a conventional design, using high-strength metals and metal alloys, the yield strength of the banding material may limit operational rotational speed, in part, to prevent excess vibration at high speed).

In the disclosed embodiments, using the same magnet dimensions, a lower strength polymeric material is able to achieve a more capable design. An engineering plastic may be more stable with temperature effects and some preload may be maintained through the axial clamping, which further reduces the load used on the external banding 38, 138, 238.

In addition to improving the structural capability of a given material selection, moldable materials such as plastics open up opportunities for molding the magnets 30, 130, 230 within a die to improve manufacturability. A plastic material selection for the rotor 26, 126, 226 may also accommodate issues due to bearing currents.

In some embodiments, an entirely or predominately nonmagnetic rotor structure may benefit from including a magnetic back-iron 40, 140, 240. This is a ferrous material on the inner diameter of the magnets (for a radial flux machine) and acts as a return path for the flux between magnets. Such a back-iron may improve motor electromagnetic performance and may be used to further stiffen the rotor structure or incorporate features to aid in assembly.

In some embodiments, this rotor 26, 126, 226 configuration may have added helix features 55 to the outer diameter 54, 154, 254. These features may be used to create a pressure differential across the rotor cavity 42, 142, 242 that can be used for active cooling, pumping the air. Some embodiments further include screened vents on either side of the rotor to introduce ambient air and expel the heated air.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A rotor assembly for an electric machine, the rotor assembly comprising
a rotor segment configured to rotate about an axis, the rotor segment having a rotor body arranged circumferentially about the axis, a side wall that extends radially away from the rotor body, and an outer band that extends axially away from the side wall to form a cavity radially between the rotor body and the outer band, wherein the side wall is integrally formed with the rotor body, and the outer band has a first end integrally formed with the side wall and a terminal second end axially opposite the first end,
a plurality of magnets located in the cavity and configured to apply a radially outward force to the outer band during rotation of the rotor assembly, and
an end plate configured to block the plurality of magnets within the cavity, the end plate having a shaft body arranged circumferentially around the axis and a cover plate that extends radially outward from the shaft body, a radial outer end of the cover plate being coupled with the terminal second end of the outer band to radially retain the second end, and wherein the end plate is coupled with the rotor segment to cause the cover plate of the end plate and the side wall of the rotor segment to cooperate and apply an axial compressive force to the plurality of magnets to transfer at least a portion of the torque axially from the rotor segment to the plurality of magnets.

2. The rotor assembly of claim 1, wherein the rotor body, side wall, and outer band are made of a non-magnetic material.

3. The rotor assembly of claim 2, wherein the non-magnetic material is a non-conductive material.

4. The rotor assembly of claim 1, wherein the rotor segment further includes an inner band arranged radially inward of the outer band relative to the axis to cooperate with the outer band to form the cavity.

5. The rotor assembly of claim 4, wherein the inner band comprises ferrous material.

6. The rotor assembly of claim 1, wherein the rotor segment further includes fasteners that extend axially through the end plate and into the outer band.

7. The rotor assembly of claim 1, wherein the cover plate is formed to define an axially and circumferentially extending channel and the second end of the outer band is received within the channel.

8. The rotor assembly of claim 1, wherein the cover plate includes a plate body and an engagement ring that extends axially away from the plate body, the engagement ring having a predetermined axial width sized with the side wall to apply a desired axial force load on the plurality of magnets.

9. The rotor assembly of claim 1, wherein the rotor segment further comprises one or more projections coupled to and extending radially away from the outer band, the one or more projections being configured to move air axially along the axis during rotation of the rotor assembly.

10. The rotor assembly of claim 9, wherein the one or more projections form a helix.

11. An electric machine adapted for use in an aircraft propulsion system, the electric machine comprising,
a stator including a plurality of windings extending along an axis and configured to rotate about the axis,
a rotor segment axially aligned with the stator and configured to rotate adjacent to the stator, the rotor segment including a rotor body arranged circumferentially about the axis, a side wall that extends radially away from the rotor body, and an outer band that extends axially away from the side wall to form a cavity radially between the rotor body and the outer band, the cavity being adapted to receive a plurality of magnets therein, wherein the outer band has a first end integrally formed with the side wall and a terminal second end axially opposite the first end, and
an end plate configured to seal the cavity and having a shaft body arranged circumferentially around the axis and coupled to a shaft of the electric machine, and a cover plate that extends radially outward from the shaft body and coupled to the outer band to cause the cover plate and the outer band to cooperate and block radial deflection of the terminal second end of the outer band to contain the plurality of magnets within the cavity during rotation of the shaft, the rotor segment, and the end plate.

12. The electric machine of claim 11, wherein the rotor body comprises a shaft band coupled to and arranged circumferentially about the shaft, a support band spaced radially outward of the shaft band and coupled to the side wall, and an intermediate band interconnecting the shaft band and the support band.

13. The electric machine of claim 12, wherein the inner band is positioned radially between the outer band and the support band.

14. The electric machine of claim 12, wherein the intermediate band extends axially away from the shaft band towards the end plate.

15. The electric machine of claim 12, wherein the shaft band, the intermediate band and the support band cooperate to define a U-shaped passageway positioned radially between the shaft band and the support band, wherein the U-shaped passageway includes an opening that is axially aligned with the side wall.

16. The electric machine of claim 11, wherein the rotor segment further includes an inner band arranged radially inward of the outer band relative to the axis to cooperate with the outer band to form the cavity.

17. The electric machine of claim 16, wherein the inner band comprises ferrous material.

18. A method comprising
providing a rotor assembly having a rotor segment and an end plate, the rotor segment including a rotor body arranged circumferentially about an axis, a sidewall that extends radially away from the rotor body, and an outer band that extends axially away from the sidewall towards the end plate,
rotating the rotor assembly about the axis such that the end plate and the side wall cooperate and apply an axial compressive force to a plurality of magnets located inside a cavity formed radially between the outer band and the rotor body to transfer at least a portion of the torque axially from the rotor segment to the plurality of magnets.

19. The method of claim 18, wherein the rotor body, side wall, and outer band are made of a non-magnetic material.

20. The method of claim 19, wherein the non-magnetic material is a non-conductive material.

\* \* \* \* \*